US012522423B2

(12) United States Patent
Surin et al.

(10) Patent No.: US 12,522,423 B2
(45) Date of Patent: Jan. 13, 2026

(54) PUSH BUTTON FOR DISTRIBUTION SYSTEM, WITH CROSSINGS OF FLUIDIC PATHS

(71) Applicant: SILGAN DISPENSING SYSTEMS LE TREPORT SAS, Le Treport (FR)

(72) Inventors: Charles Surin, Chardonnay (FR); Phillippe Bastos, Ouroux sur Saone (FR); Alain Pagneux, Val-Sonnette (FR)

(73) Assignee: SILGAN DISPENSING SYSTEMS LE TREPORT, Le Treport (FR)

(*) Notice: Subject to any disclaimer, the term of this patent is extended or adjusted under 35 U.S.C. 154(b) by 0 days.

(21) Appl. No.: 18/614,909

(22) Filed: Mar. 25, 2024

(65) Prior Publication Data

US 2024/0400293 A1 Dec. 5, 2024

Related U.S. Application Data

(62) Division of application No. 16/916,084, filed on Sep. 16, 2020, now Pat. No. 11,939,140.

(51) Int. Cl.

| | |
|---|---|
| ***B65D 83/20*** | (2025.01) |
| *B05B 1/14* | (2006.01) |
| *B65D 83/28* | (2006.01) |

(52) U.S. Cl.

CPC ................ *B65D 83/20* (2013.01); *B05B 1/14* (2013.01); *B65D 83/28* (2013.01)

(58) Field of Classification Search

CPC ....... B05B 1/14; B05B 7/2405; B05B 7/2472; B65D 83/20; B65D 83/28; B65D 83/68; B65D 83/682

USPC ....... 239/303, 304, 305, 306, 333, 390, 391, 239/394, 418, 433, 543, 544, 549; 222/129, 135, 402.1, 402.13

See application file for complete search history.

(56) References Cited

U.S. PATENT DOCUMENTS

| | | | | | |
|---|---|---|---|---|---|
| 3,045,925 | A * | 7/1962 | Giangualano | B65D 83/682 | 239/544 |
| 3,693,837 | A * | 9/1972 | Yuhas | B05B 7/0876 | 222/330 |
| 3,976,223 | A * | 8/1976 | Jass | B65D 83/682 | 222/94 |
| 4,792,062 | A * | 12/1988 | Goncalves | B65D 83/68 | 222/402.13 |
| 5,735,465 | A * | 4/1998 | Laforcade | B65D 83/60 | 239/337 |
| 2016/0083171 | A1 * | 3/2016 | Ogata | B65D 83/28 | 222/149 |

* cited by examiner

*Primary Examiner* — Steven J Ganey

(57) ABSTRACT

The invention proposes a pushbutton for a system for dispensing several pressurized products, the pushbutton including: a body; a spraying nozzle secured to the body, the body and the nozzle forming a subassembly, the nozzle being provided with several outlet orifices, each outlet orifice being linked to a product. The pushbutton includes a first channel passing through the body and the nozzle and forming a passage for a first product arriving in a first well of the body and emerging through a first outlet orifice of the nozzle. It also includes a second channel passing through the nozzle only and forming a passage for a second product arriving in a well of the nozzle and emerging through a second outlet orifice of the nozzle overhanging the first outlet orifice.

8 Claims, 6 Drawing Sheets

PUSH BUTTON FOR DISTRIBUTION SYSTEM, WITH CROSSINGS OF FLUIDIC PATHS

CROSS-REFERENCE TO RELATED APPLICATIONS

The present application is a Divisional of U.S. patent application Ser. No. 16/916,084 entitled "PUSH BUTTON FOR DISTRIBUTION SYSTEM, WITH CROSSINGS OF FLUIDIC PATHS" filed 16 Sep. 2020 and which claims the benefit of priority to French Patent Application No. 1907085 filed on Jun. 28, 2019, the disclosure of each which are hereby incorporated by reference in their entireties.

BACKGROUND OF THE INVENTION

Field of the Invention

The invention relates to a pushbutton for a system for dispensing several pressurized products, as well as such a dispensing system, and more particularly to a dispensing system intended to equip vials used in perfume-making, in cosmetics or for pharmaceutical treatments.

Description of Related Art

A dispensing system is known, including two tanks each containing a fluid product. The pushbutton includes two outlet orifices, each outlet orifice being dedicated to a product. In this case, the fluids are only mixed on exiting onto the target.

In a first example, the pushbutton includes a body which has two fluid pathways in communication, on the one hand, with the two tanks, and on the other hand, with the two outlet orifices made directly on the body.

In a second example, the pushbutton includes a body split into two parts, a right-hand part and a left-hand part, each part being in fluid communication with a tank, and each part including an outlet orifice.

In a third example, the pushbutton includes a body and a dispensing nozzle. The body has two fluid pathways in communication, on the one hand, with the two tanks, and on the other hand, with the nozzle which has the two outlet orifices.

In each of these examples, the two tanks are always positioned side-by-side along a direction of alignment, and the pushbutton is situated mounted above these two tanks, the two outlet orifices being aligned along a straight line parallel to the direction of alignment of the tanks. Thus, the dispensing system includes a fluid pathway on the right-hand side, in line with the right-hand tank and the right-hand outlet orifice, and a fluid pathway on the left-hand side with the left-hand tank and the left-hand outlet orifice. Consequently, the two fluid pathways do not intersect one another.

The aim of the present invention is to have a fluid dispenser composed of three tanks (trio system) not aligned, each tank being equipped with a pump, one single pushbutton to actuate the three pumps and provided with three outlet orifices arranged in a triangle, for example equilateral, an upper orifice overhanging the two others. The tanks are installed in a triangle and one of them is situated vertically from the orifices of the pushbutton (facing tank). The two others are to the rear, i.e. on the side opposite the orifices. The facing tank must be in communication with the upper orifice, which therefore implies that the supply channels, extending from each pump to each orifice, intersect in the pushbutton. This situation makes the manufacturing of the nozzle very difficult, the manufacturing of the nozzle in one single part, as the pins of the injection mould must thus intersect. In addition, the space between the two lower orifices is smaller than the outlet diameter of the upper orifice.

The technical problem is the same with a duo system, i.e. including two tanks instead of three tanks. In this case, there is a facing tank in communication with an upper orifice and a rear tank in communication with a lower orifice. The upper orifice overhangs the lower orifice. The two orifices are aligned vertically. The manufacturing in one single part of the nozzle is difficult, as the pins of the injection mould must intersect, as in the trio system.

BRIEF SUMMARY OF THE INVENTION

This aim is achieved thanks to a pushbutton for a system for dispensing several pressurised products, the pushbutton including:

- a body;
- a spraying nozzle secured to the body, the body and the nozzle forming a subassembly, the nozzle being provided with several outlet orifices, each outlet orifice being linked to a product.

The pushbutton includes a first channel passing through the body and the nozzle and forming a passage for a first product arriving in a first well of the body and emerging through a first outlet orifice of the nozzle.

This pushbutton is mainly characterised in that it also includes a second channel passing only through the nozzle and forming a passage for a second product arriving in a well of the nozzle and emerging through a second outlet orifice of the nozzle overhanging the first outlet orifice.

The main idea of this invention consists of using the nozzle as such to directly connect it to a tank, without passing through the body of the pushbutton as is traditionally done.

This makes it possible to create a shortcut, by bypassing the body of the pushbutton. The fluid pathways are all the more simplified, as the second channel only passes through the nozzle and avoids the body. The idea is to directly connect the nozzle to the facing tank, located under the nozzle. The fluid pathway is thus very short. The body itself is used to connect a rear tank. The two outlet orifices are not aligned horizontally, but are arranged a different heights within the nozzle. A fluid pathway must therefore pass above the other fluid pathway within the nozzle. There is therefore an intersection of fluid pathways in the nozzle.

The fact that the second channel only passes through the nozzle has the effect, that in case of sealing defect of the junction between the two body/nozzle parts, the first product and the second product can never, all the same, be mixed.

According to the different embodiments of the invention, which can be taken together or separately:

the pushbutton includes a third channel passing through the body and the nozzle and forming a passage for a third product arriving in a second well of the body and emerging through a third outlet orifice of the nozzle: in this case, the body is passed through by only two channels out of the three existing channels. The body makes it possible to connect the nozzle to the two rear tanks of the dispensing system.

the three outlet orifices are arranged in a triangle, the second outlet orifice overhanging the two other outlet orifices: this is a conventional distribution for a nozzle, such that the three doses of products exiting from these three orifices are collected to the maximum, and such that the user thus recovers a general dose forming one single massive drop, rather than three small aligned drops.

each channel includes an axial section and a transversal section of appearance perpendicular to the axial section: indeed, there is an axial section which makes it possible to make the link between the pump and the pushbutton, and which is extended by a transversal section which makes it possible to make the link to the corresponding outlet orifice.

the transversal sections of the first and third channels extend in one same transversal plane, including the first and third outlet orifices of the nozzle: the transversal sections of the first and third channels are therefore situated at the same height as the corresponding outlet orifices, in the pushbutton.

the axial section of the second channel passes through the transversal plane and passes between the two transversal sections of the first and second channels, within the nozzle: thus, the transversal section of the second channel is not situated in the same transversal plane as the transversal sections of the first and third channels, but is situated at an upper level, so as to be located at the same height as the second outlet orifice.

the transversal sections of the first and third channels are deviated by extending from the outlet orifices, leaving a space sufficient for the passage of the axial section of the second channel: given that the space between the two lower orifices (first and third) is smaller than the diameter of the second channel, it is necessary that the first and third channels are deviated in order to leave more space between them such that the second channel can pass through, in this case, the axial section of the second channel.

This deviation allows the different channels to correctly intersect within the nozzle, while remaining sealed against one another.

the nozzle and the body consist of two separate parts, assembled to form the subassembly.

the nozzle and the body are assembled by the interlocking of corresponding hollow shapes partially forming the first and third channels: the nozzle and the body are assembled with an individual sealing of each channel.

the nozzle and the body consist of one single part forming the subassembly, the nozzle being secured to the body by overmoulding: for example, by bi-injection.

The invention also relates to a system for dispensing several pressurised products including a pushbutton such as described above.

Preferably, this dispensing system includes three tanks, each provided with a pump, each tank being linked to an outlet orifice of the nozzle.

This dispensing system includes a facing portion, wherein the outlet orifices of the nozzle open out, and a rear portion opposite the facing portion. A first tank is located in the facing portion and linked to the second channel, the two other tanks being located in the rear portion and linked to the first and third channels.

Practically, the dispensing system includes a sleeve mounted on the tanks, the body of the pushbutton being mounted on this sleeve.

The body of the pushbutton has a funnel capable of being interlocked on a central well of the sleeve.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

In relation to the figures, below is described a pushbutton 1 for a system for dispensing a product, in particular pressurised liquid, the product could be of any nature, in particular used in perfume-making, in cosmetics or for pharmaceutical treatments.

Figure 1:
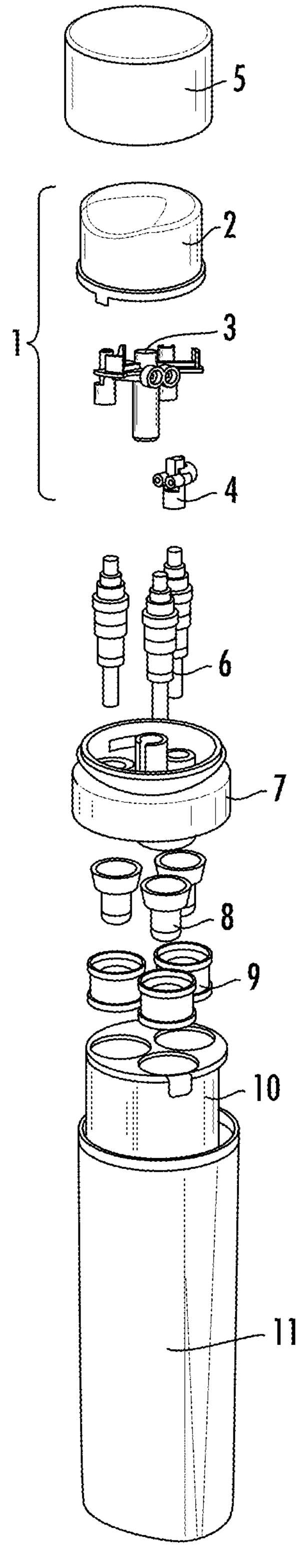
FIG. 1 is an exploded view of a dispensing system including the pushbutton according to the invention.
Figure 2:
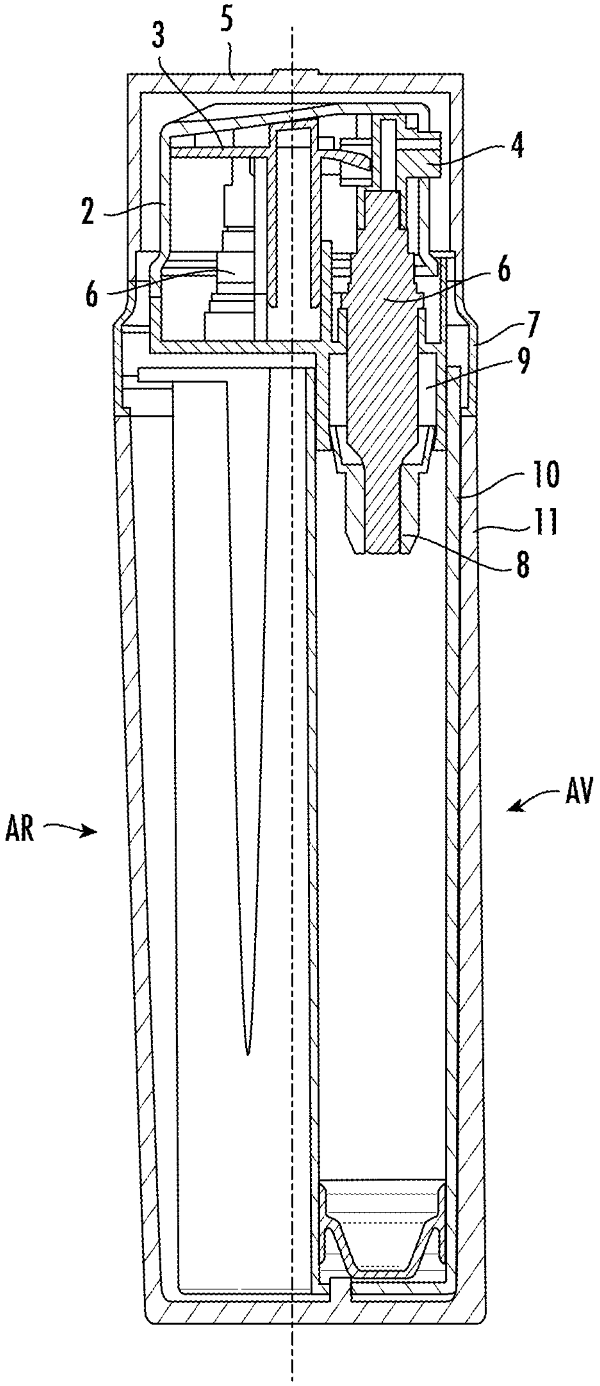
FIG. 2 is a cross-sectional view of the dispensing system according to FIG. 1.
Figure 3:
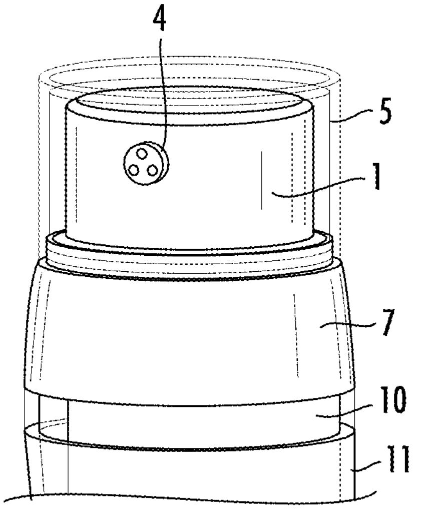
FIG. 3 is a front view of the dispensing system, highlighting the pushbutton.

In relation to FIGS. 1 to 3, the dispensing system includes a pushbutton 1 protected by a cap 5 and connected to an extraction device mounted inside a vial 11 which contains the product to be dispensed.

The extraction device can include a manual actuation pump 6, as is the case in the figures presented, or a manual actuation valve in the case where the product is packaged pressurised in the vial 11. Thus, during a manual movement of the pushbutton 1, the pump 6 of the valve is actuated to supply the pressurised product to the pushbutton 1.

In the present case, there is a vial 11 inside which three tanks 10 are located, each containing a different product. Each tank 10 is associated with a pump 6. There are therefore three pumps 6, with three pistons 9 and three drain rings 8, maintained in a sleeve 7 fixed on the vial 11. The pushbutton 1 is directly associated with these three pumps 6 by way of three wells 17a, 17b, 18 allowing the fluid passage between the tanks 10 and the pushbutton 1.

The pushbutton 1 is mainly composed of three parts, namely:

- a body 3 having, in the present case, two mounting wells 17a, 17b capable of being secured with two inlet tubes of the pressurised product belonging to two pumps 6;
- a spraying nozzle 4 secured to the body 3 and in fluid communication with the wells 17a, 17b, this nozzle 4 itself having a mounting well 18 capable of being secured with an inlet tube of the pressurised product belonging to a third pump 6;
- an aspect bezel 2 which surrounds the body 3 and the nozzle 4, and which has an upper supporting zone 21 on which the user can press to activate the pushbutton 1 manually, in this case to be able to axially move it.

The body 3 and the nozzle 4 form a subassembly, which is inserted inside the bezel 2.

In the present case, as can be seen in FIG. 3, the nozzle 4 has three dispensing orifices 22, to dispense the three products contained in the three tanks 10. Each orifice 22 is connected independently with a pump 6 and the corresponding tank 10 by independent fluid passages.

Figure 4:
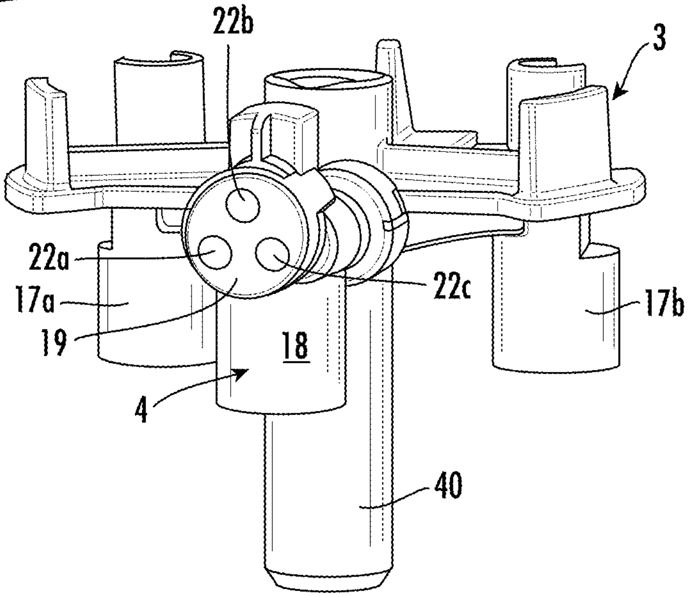
FIG. 4 is a perspective view of a subassembly of the pushbutton, composed of a body and a nozzle.
Figure 5:
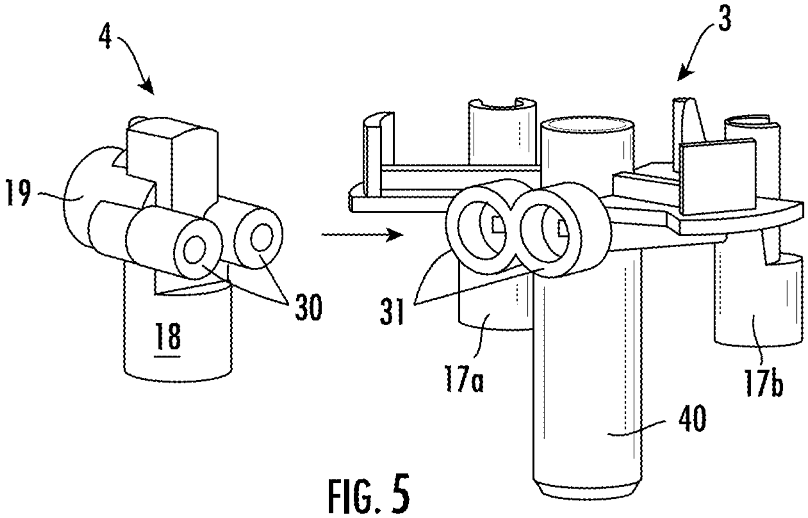
FIG. 5 is an exploded view of the subassembly of FIG. 4.

In the present case, as illustrated in FIGS. 4 and 5, the nozzle 4 is fixed to the body 3 by interlocking corresponding shapes. In this case, the nozzle 4 has a rear face provided with two hollow cylindrical sections 30, capable of being interlocked inside two other hollow cylindrical sections 31, of greater dimension, provided on a facing portion of the body 3. Each hollow cylindrical section 31 of the body 3 is extended perpendicularly through one of the wells 17a, 17b described above.

The nozzle 4 and the body 3 are thus two separate parts which are secured to one another in order to form the subassembly.

It would however be absolutely feasible to foresee that the nozzle 4 is overmoulded on the body 3 during a second moulding step. In this case, the nozzle 4 and the body 3 would only form one single part, forming the subassembly.

The bezel 2 itself, illustrated in FIG. 5, is a hollow revolving part, of cylindrical appearance, closed in the upper portion by the supporting surface 21, and having a window 20 at the level of its peripheral wall 29.

This window 20 is provided to let the nose 19 of the nozzle 4 pass through, which constitutes the facing face of the nozzle 4, where the three dispensing orifices 22a, 22b, 22c open out.

In the example presented, the dispensing system has a facing face AV, illustrated in FIG. 2, defined by the nose of the nozzle 4. At the level of this facing face AV a facing tank 10 is located, situated directly under the nozzle 4. This facing tank 10 is directly connected to the nozzle 4 via the central well 18 of the nozzle 4. There are then two rear tanks 10, located in the rear portion AR of the dispensing system. In particular, there is a left-hand rear tank 10 connected to the body 3 via the left-hand rear well 17a, there is a right-hand rear tank 10 connected to the body 3 via the right-hand rear well 17b. Finally, the three tanks 10 are arranged in a triangle as a top view, with a facing tank 10 under the nozzle 4 and two rear tanks 10 under the body 3.

Figure 6:
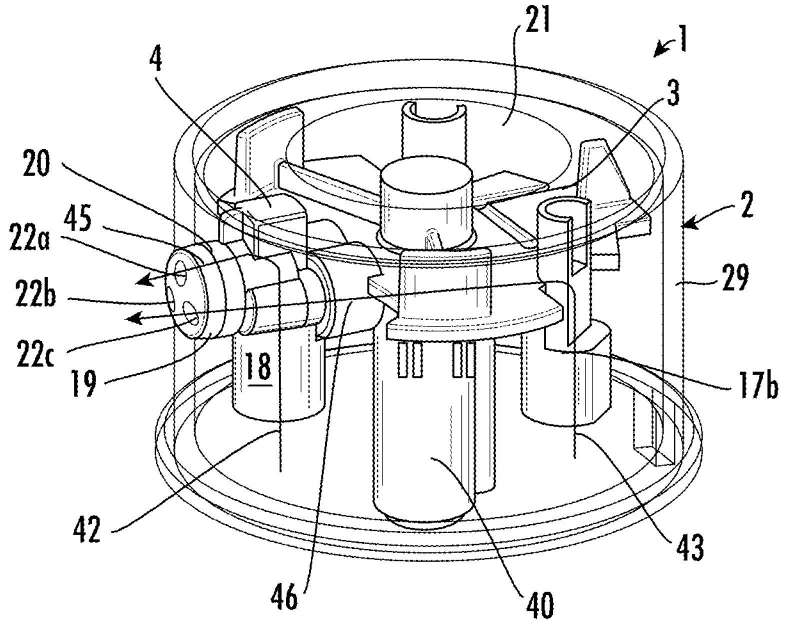
FIG. 6 is a perspective and transparent view of the pushbutton according to the invention, composed of a body, a nozzle, and a bezel.

In reference to FIG. 6, it can be seen that the nozzle 4 includes three outlet orifices 22a, 22b, 22c arranged in a triangle, in the present equilateral case, with an upper orifice 22b which overhangs two lower orifices 22a, 22c. For better clarity, the left-hand lower orifice 22a will be called first outlet orifice, the upper orifice 22b will be called second outlet orifice, and the right-hand lower orifice 22c will be called third outlet orifice.

In this FIG. 6, two fluid pathways are represented with arrows.

Figure 7:
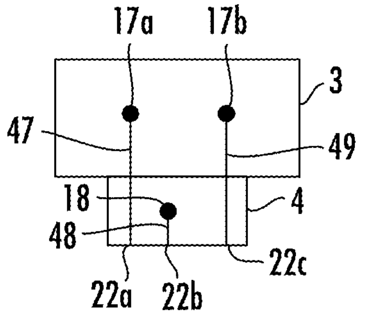
FIG. 7 schematically illustrates, as a top view, the body and the nozzle, as well as the different fluid channels passing through them.

In particular, one of the fluid pathways starts in a well 17b of the body 3, then passes through the body 3, then arrives in the nozzle 4 and emerges through one of the lower orifices 22c. The other fluid pathway starts in the well 18 of the nozzle 4, passes through the nozzle 4 and emerges through the upper orifice 22b. There is also a third fluid pathway in the present example, but which cannot be seen in FIG. 6, through its orientation. This third fluid pathway is moreover represented in FIG. 7. In this FIG. 7, as a top view, and very schematically, the body 3 and the nozzle 4 of the subassembly of the pushbutton I are seen. In this diagram, the three fluid pathways are represented.

These pathways are materialised in concrete terms by channels. More specifically, the subassembly includes a first channel 47 arriving at the level of the right-hand side body 3, passing through the body 3, then passing through the nozzle 4 to arrive at the first outlet orifice 22a. The subassembly includes a second channel 48 arriving at the level of the nozzle 4 directly, without passing through the body 3, and ending at the level of the second outlet orifice 22b. Finally, the subassembly includes a third channel 49 arriving at the level of the left-hand side body 3, passing through the body 3, then passing through the nozzle 4 to arrive at the third outlet orifice 22c. It can clearly be seen that the second channel 48 is situated between the first channel 47 and the third channel 49.

Each channel 47, 48, 49 therefore transports a product, as has been mentioned above. At the nozzle 4 outlet, each orifice 22a, 22b, 22c deliver a dose of a product, and the user recovers a total mass composed of three doses of the three products. The three orifices 22a, 22b, 22c are very close to one another such that the user recovers one single homogenous drop, and not three separate small drops.

Each channel 47, 48, 49 includes an axial section and a transversal section of appearance perpendicular to the axial section. By axial section, this means a section which is developed about the axis for mounting the dispensing system.

Figure 8:
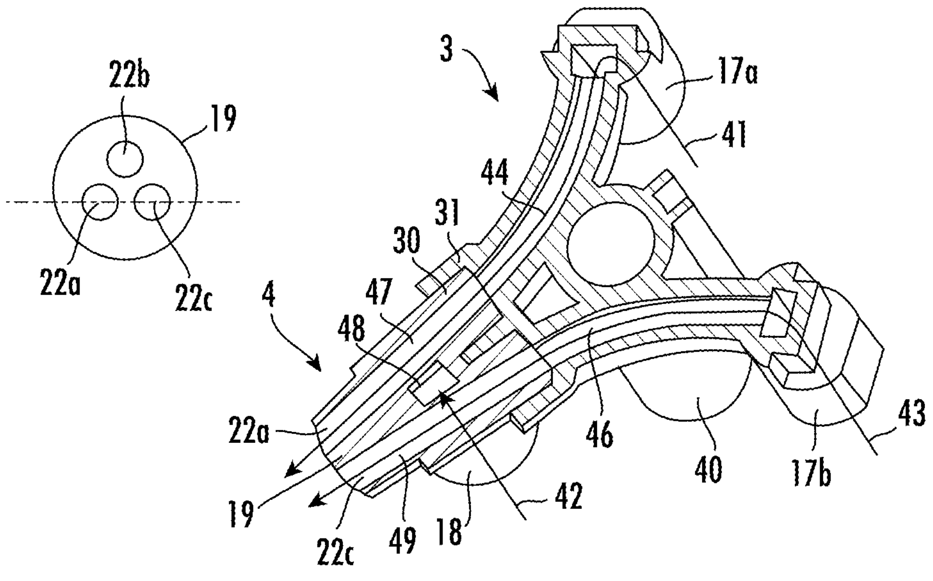
FIG. 8 is a cross-sectional and perspective view of the subassembly according to a transversal plane passing through the two lower outlet orifices of the nozzle, as schematically represented by the drawing on the left of the figure.

In FIG. 8, are represented the first channel 47 and the third channel 49, in particular thanks to a transversal cross-section at the level of the plane containing the transversal section 44 of the first channel 47 and the transversal section 46 of the third channel 49. This cross-sectional plane is in particular illustrated on the small diagram on the left of the figure. It is seen that this transversal plane passes through the two lower outlet orifices 22a, 22c. Thanks to the perspective of the figure, the axial sections 41, 42, 43 of the three channels 47, 48, 49 are also perceived.

For the first channel 47, situated on the left-hand side of the subassembly, the axial section 41 which passes through the mounting well 17a is perceived, then which is extended perpendicularly through the transversal section 44 which first passes through the body 3 then the nozzle 4, before opening out at the level of the first outlet orifice 22a.

For the third channel 49, situated on the right-hand side of the subassembly, the axial section 43 which passes through the mounting well 17b is perceived, which is extended perpendicularly through the transversal section 46 which first passes through the body 3 then the nozzle 4, before opening out at the level of the third outlet orifice 22c.

The transversal sections 44, 46 of the first channel 47 and of the third channel 49 get closer together as they progress towards the nozzle 4 and towards the outlet orifices 22*a*, 22*c*. Thus, the deviation between these transversal sections 44, 46 is maximal at the level of the wells 17*a*, 17*b*, and is minimal at the level of the nose 19 of the nozzle 4, such that the first orifice 22*a* and the third outlet orifice 22*c* are very close to one another.

In this FIG. 8, a portion of the axial section 42 of the second channel 48 is also perceived, which starts in the central well 18 of the nozzle 4, and which passes through the nozzle 4 over all of its height, by passing between the transversal sections 44, 46 of the first channel 47 and of the third channel 49. There is therefore an intersection between the axial section 42 of the second channel 48 and the transversal sections 44, 46 of the two other channels 47, 49. Indeed, the well 18 of the nozzle 4 is offset with respect to the nose 19 of the nozzle 4, such that the deviation between the transversal section 44 of the first channel 47 and the transversal section 46 of the third channel 49 is sufficient such that the axial section 42 of the second channel 48 can pass, while ensuring a sealing between these different sections 44, 46, 42, and while avoiding a reduction of the cross-section of the channels 47, 49, 48.

Figure 9:
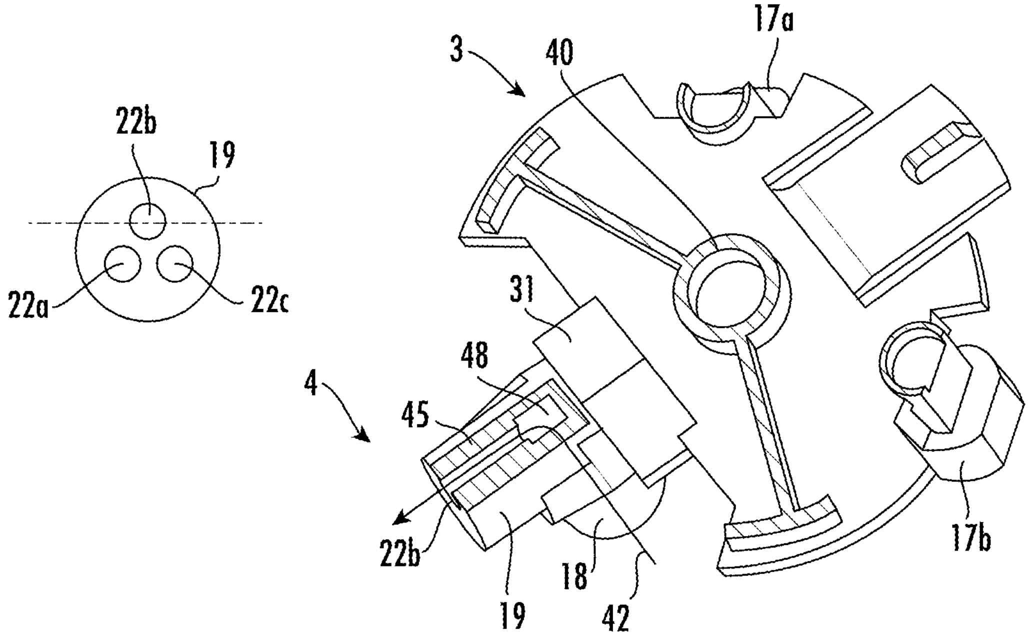
FIG. 9 is a cross-sectional and perspective view of the subassembly along a transversal plane passing through the upper outlet orifice of the nozzle, as schematically represented by the drawing on the left of the figure.
Figure 10:
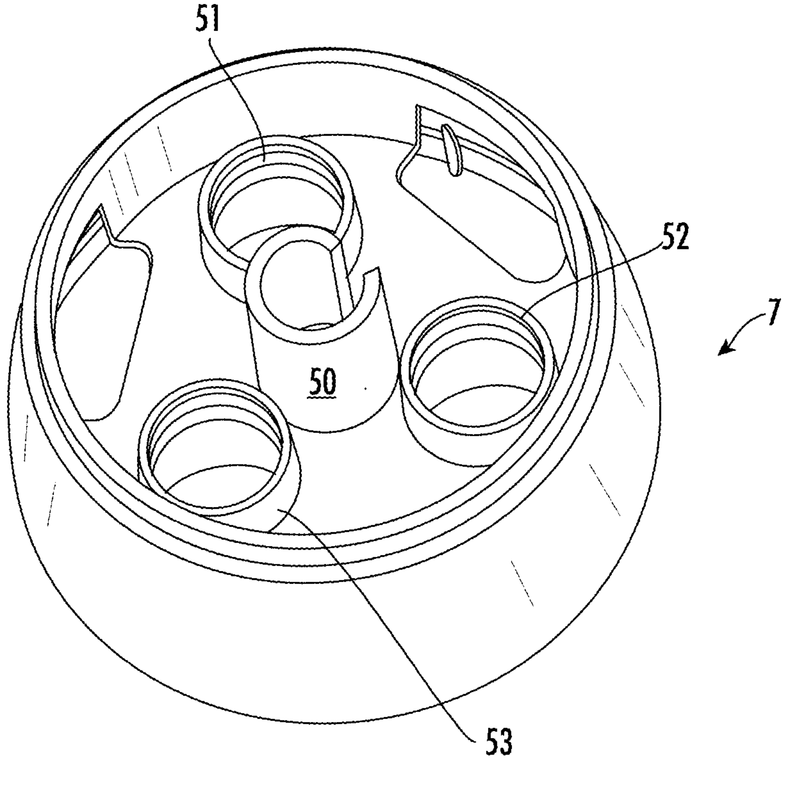
FIG. 10 shows, as a perspective, a sleeve for fixing the pushbutton on a vial of the dispensing system.

In FIG. 9, the end of the axial section 42 of the second channel 48 is perceived, which is then extended perpendicularly through the transversal section 45 which opens out at the level of the outlet orifice 22*b*. This can be seen, thanks to a transversal cross-section made this time at the level of the second outlet orifice 22*b*, as is illustrated by the small diagram on the left of the figure.

The pushbutton 1 is fixed on the vial of the dispensing system, by means of a sleeve 7. More specifically, the body 3 of the pushbutton 1 includes a central funnel 40 capable of being interlocked on a central well 50 of the sleeve 7. The sleeve 7 itself also includes three hollow cylindrical sections 51, 52, 53 capable of receiving the three pumps 6 of the dispensing system. One of the cylindrical sections 51, 52, 53 is situated in the facing portion of the system, to be able to correspond with the facing tank 10, and the two other cylindrical sections are situated in the rear portion of the system, to be able to correspond with the two rear tanks 10.

Figure 11A:
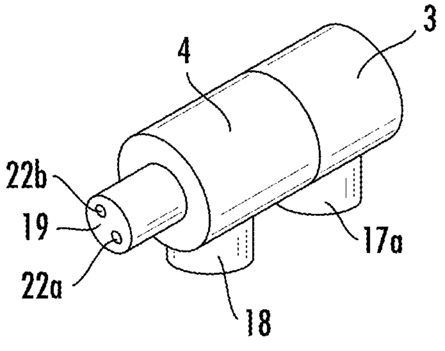
FIG. 11 shows a duo system according to the invention.
Figure 11B:
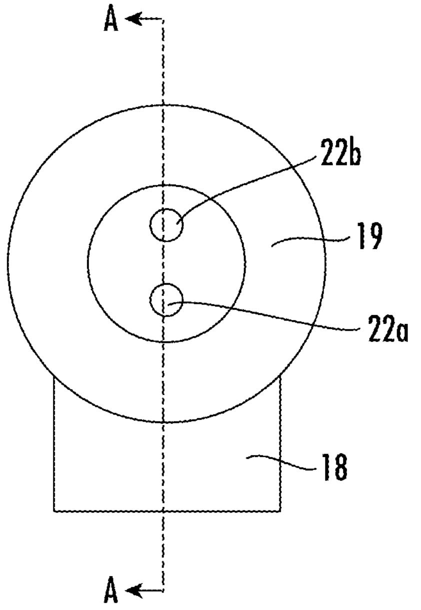
Figure 11C:
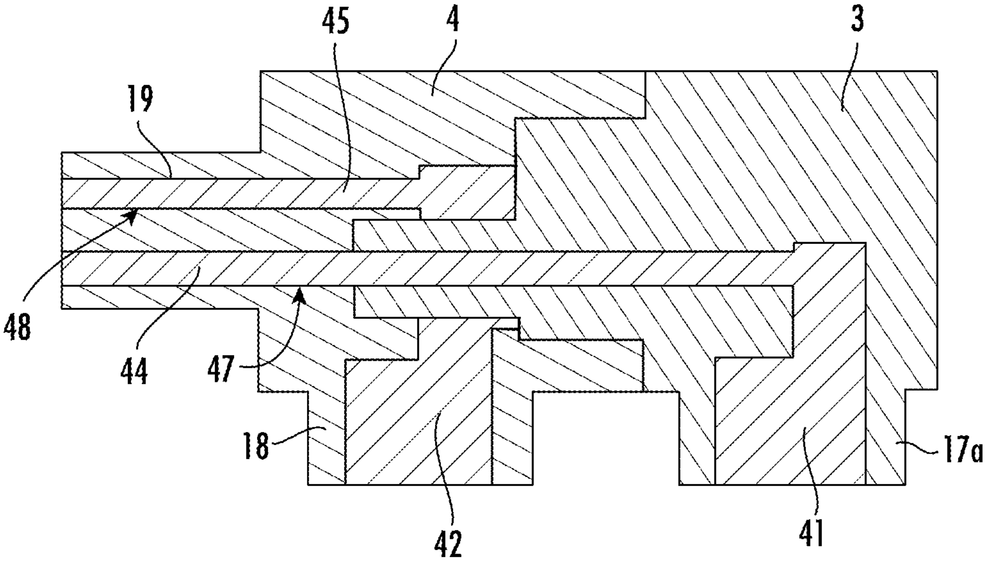

FIG. 11 groups together FIGS. 11*a*, 11*b* and 11*c* which show a duo system according to the invention. The same reference signs as those of the trio system above are used.

FIG. 11*a* is a perspective view. FIG. 11*b* is a front view opposite the nozzle. FIG. 11*c* is a cross-sectional view along A-A such as defined in FIG. 11*b*.

The nozzle is provided with a lower outlet orifice 22*a* (first orifice), and an upper outlet orifice 22*b* (second orifice), as illustrated in FIGS. 11*a* and 11*b*.

According to FIG. 11*c*, the pushbutton includes a first channel 47 passing through the body 3 and the nozzle 4 and forming a passage for a first product arriving in a first well 17*a* of the body 3 and emerging through the first outlet orifice 22*a* of the nozzle 4.

The pushbutton also includes a second channel 48 passing through the nozzle 4 only and forming a passage for a second product arriving in a well 18 of the nozzle 4 and emerging through the second outlet orifice 22*b* of the nozzle 4 overhanging the first outlet orifice 22*a*.

In this case, the second channel 48 is concentric and is developed around the first channel 47.

More specifically, the axial section 42 of the second channel 48 is concentric with a portion of the transversal section 44 of the first channel 47.

The configurations shown in the figures cited are only possible examples, not at all limiting, of the invention which includes, on the contrary, the variants of shapes and designs in the scope of a person skilled in the art.

Of note, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", and/or "including," when used in this specification, specify the presence of stated features, integers, steps, operations, elements, and/or components, but do not preclude the presence or addition of one or more other features, integers, steps, operations, elements, components, and/or groups thereof.

As well, the corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A pushbutton for a system for dispensing several pressurized products, said pushbutton comprising:

a body;

a spraying nozzle secured to the body, the body and the nozzle forming a subassembly, the nozzle being provided with several outlet orifices, each outlet orifice being linked to a product;

said pushbutton comprising a first channel passing through the body and the nozzle and forming a passage for a first product arriving in a first well of the body and emerging through a first outlet orifice of the nozzle, and a second channel passing through the nozzle only and forming a passage for a second product arriving in a well of the nozzle and emerging through a second outlet orifice of the nozzle overhanging said first outlet orifice.

2. The pushbutton according to claim 1, wherein each channel comprises an axial section and a transversal section of appearance perpendicular to the axial section.

3. The pushbutton according to claim 1, wherein the nozzle and the body consist of two separate parts assembled to form said subassembly.

4. The pushbutton according to claim 3, wherein the nozzle and the body are assembled by the interlocking of corresponding hollow shapes.

5. The pushbutton according to claim 1, wherein the nozzle and the body consist of one single part forming said subassembly, the nozzle being secured to the body by over-molding.

6. A system for dispensing several pressurized products comprising:

a pushbutton comprising a body;

a spraying nozzle secured to the body, the body and the nozzle forming a subassembly, the nozzle being provided with several outlet orifices, each outlet orifice being linked to a product;

said pushbutton comprising a first channel passing through the body and the nozzle and forming a passage for a first product arriving in a first well of the body and emerging through a first outlet orifice of the nozzle, and a second channel passing through the nozzle only and forming a passage for a second product arriving in a well of the nozzle and emerging through a second outlet orifice of the nozzle overhanging said first outlet orifice.

7. A pushbutton subassembly, comprising:

a body, comprising:

a first well;

a first channel connected to the first well and passing through the body;

a nozzle secured to the body, the nozzle comprising:

a first outlet orifice in communication with the first channel;

a second well;

a second channel connected to the second well and passing through the nozzle; and a second outlet orifice in communication with the second channel.

8. The pushbutton subassembly of claim 7, wherein the first outlet orifice, the second outlet orifice are arranged in a vertical arrangement, the second outlet orifice above the first outlet orifice.

* * * * *